(12) United States Patent  
Chen et al.

(10) Patent No.: US 12,499,381 B2
(45) Date of Patent: Dec. 16, 2025

(54) CONTROLLING A QUANTUM COMPUTING SYSTEM USING IMAGINARY-TIME EVOLUTION

(71) Applicant: Tencent Technology (Shenzhen) Company Limited, Guangdong (CN)

(72) Inventors: Yuqin Chen, Shenzhen (CN); Shengyu Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 615 days.

(21) Appl. No.: 17/986,771

(22) Filed: Nov. 14, 2022

(65) Prior Publication Data

US 2023/0289639 A1 Sep. 14, 2023

Related U.S. Application Data

(63) Continuation of application No. PCT/CN2021/133711, filed on Nov. 26, 2021.

(30) Foreign Application Priority Data

Oct. 20, 2021 (CN) .......................... 202111222031.8

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ................................ G06N 10/20; G06N 10/40
See application file for complete search history.

(56) References Cited

U.S. PATENT DOCUMENTS 11,469,485 B2 * 10/2022 Lauer .................... H10N 69/00
12,190,031 B2 * 1/2025 Motta .................... G06F 30/27
(Continued)

FOREIGN PATENT DOCUMENTS

CN 102663207 B 9/2016

OTHER PUBLICATIONS

McArdle, Sam, et al. "Variational ansatz-based quantum simulation of imaginary time evolution." npj Quantum Information 5.1 (2019): 1-6.

(Continued)

*Primary Examiner* — David E Choi
(74) *Attorney, Agent, or Firm* — ArentFox Schiff LLP

(57) ABSTRACT

A quantum computing method includes determining an initial quantum state of a quantum system, and inputting the initial quantum state to a quantum circuit corresponding to the quantum system and obtaining a quantum state outputted by the quantum circuit, wherein the outputted quantum state is a quantum circuit generation state corresponding to the quantum system. The method further includes updating a quantum system parameter based on the outputted quantum circuit generation state. The quantum system parameter includes a quantum imaginary-time parameter. The method further includes updating a quantum circuit parameter of the quantum circuit according to the updated quantum system parameter to obtain an updated quantum system, and determining a final quantum state of the quantum system as a minimum eigenstate of the quantum system.

15 Claims, 6 Drawing Sheets

(56) References Cited

U.S. PATENT DOCUMENTS

| | | | | |
|---|---|---|---|---|
| 2014/0297247 | A1* | 10/2014 | Troyer | G06N 7/01 703/21 |
| 2018/0150760 | A1* | 5/2018 | Sarpeshkar | H03H 11/1204 |
| 2018/0150761 | A1* | 5/2018 | Sarpeshkar | G06N 20/00 |
| 2019/0156239 | A1* | 5/2019 | Martinis | G06N 10/70 |
| 2021/0011748 | A1* | 1/2021 | Lee | G06N 10/20 |
| 2021/0166149 | A1* | 6/2021 | Hsieh | G06N 20/00 |
| 2021/0398621 | A1* | 12/2021 | Stojevic | G06N 3/047 |
| 2022/0309377 | A1* | 9/2022 | Yu | G06F 30/20 |
| 2022/0374239 | A1* | 11/2022 | Freedman | G06N 10/00 |
| 2022/0375339 | A1* | 11/2022 | Luo | G06F 17/18 |
| 2023/0162079 | A1* | 5/2023 | Chen | G06N 10/60 706/62 |
| 2023/0267357 | A1* | 8/2023 | Wang | G06N 10/20 706/62 |
| 2023/0289639 | A1* | 9/2023 | Chen | G06N 10/60 |
| 2024/0362514 | A1* | 10/2024 | Reilly | G06N 10/20 |
| 2025/0028783 | A1* | 1/2025 | Babbush | G06F 30/20 |

OTHER PUBLICATIONS

Magann, Alicia B., et al. "Feedback-based quantum optimization." Physical Review Letters 129.25 (2022): 250502.

Peruzzo, Alberto, et al. "A variational eigenvalue solver on a photonic quantum processor." Nature communications 5.1 (2014): 4213.

Schirmer, Sonia G., H. Fu, and Allan I. Solomon. "Complete controllability of quantum systems." Physical Review A 63.6 (2001): 063410.

Cong, Shuang, and Fangfang Meng. "A survey of quantum lyapunov control methods." The Scientific World Journal 2013 (2013).

Sim, Sukin, Peter D. Johnson, and Alán Aspuru-Guzik. "Expressibility and entangling capability of parameterized quantum circuits for hybrid quantum-classical algorithms." Advanced Quantum Technologies 2.12 (2019): 1900070.

* cited by examiner

410

CONTROLLING A QUANTUM COMPUTING SYSTEM USING IMAGINARY-TIME EVOLUTION

RELATED APPLICATIONS

This application is a continuation of International Application No. PCT/CN2021/133711, filed on Nov. 26, 2021, which claims priority to Chinese Patent Application No. 202111222031.8, entitled "QUANTUM COMPUTING METHOD AND APPARATUS, DEVICE, MEDIUM, AND PRODUCT", and filed on Oct. 20, 2021. The entire disclosures of the prior applications are hereby incorporated by reference.

FIELD OF THE TECHNOLOGY

Embodiments of this application relate to the field of quantum technologies, including a quantum computing method and apparatus, a device, a medium, and a product.

BACKGROUND OF THE DISCLOSURE

With the rapid development of quantum computing, quantum algorithms have important applications in many fields. Solving eigenstates and eigenenergy of quantum systems is a quite critical issue.

In the related art, a method for obtaining a lowest eigenstate by imaginary-time evolution is provided. After a wave function in the imaginary-time Schrödinger equation is expressed by eigenvector expansion, a minimum eigenvalue is determined. Since the minimum eigenvalue is less than any eigenvalue, when time approaches infinity, other eigenvalues disappear at an exponential speed. Therefore, given any wave function whose overlap with the minimum eigenvalue is not 0, an initial lowest eigenstate can be obtained by inversion.

However, in the foregoing method, it is necessary to ensure an overlapping relationship between the initial state and the lowest eigenstate, and the difference between other eigenstates and the lowest eigenstate, and the relationship therebetween greatly affects a convergence rate.

SUMMARY

Embodiments of this disclosure provide a quantum computing method and apparatus, a device, a medium, and a product.

In an embodiment, a quantum computing method includes determining an initial quantum state of a quantum system, and inputting the initial quantum state to a quantum circuit corresponding to the quantum system and obtaining a quantum state outputted by the quantum circuit. The outputted quantum state is a quantum circuit generation state corresponding to the quantum system. The method further includes updating a quantum system parameter based on the outputted quantum circuit generation state. The quantum system parameter includes a quantum imaginary-time parameter. The method further includes updating a quantum circuit parameter of the quantum circuit according to the updated quantum system parameter to obtain an updated quantum system, and determining a final quantum state of the quantum system as a minimum eigenstate of the quantum system.

In an embodiment, a quantum computing apparatus includes processing circuitry configured to determine an initial quantum state of a quantum system, and to input the initial quantum state to a quantum circuit corresponding to the quantum system and obtain a quantum state outputted by the quantum circuit. The outputted quantum state is a quantum circuit generation state corresponding to the quantum system. The processing circuitry is further configured to update a quantum system parameter based on the outputted quantum circuit generation state. The quantum system parameter includes a quantum imaginary-time parameter. The processing circuitry is further configured to update a quantum circuit parameter of the quantum circuit according to the updated quantum system parameter to obtain an updated quantum system, and determine a final quantum state of the quantum system as a minimum eigenstate of the quantum system.

In an embodiment, a non-transitory computer-readable storage medium stores computer-readable instructions thereon, which, when executed by a computer device, cause the computer device to perform a quantum computing method. The quantum computing method includes determining an initial quantum state of a quantum system, and inputting the initial quantum state to a quantum circuit corresponding to the quantum system and obtaining a quantum state outputted by the quantum circuit. The outputted quantum state is a quantum circuit generation state corresponding to the quantum system. The method further includes updating a quantum system parameter based on the outputted quantum circuit generation state. The quantum system parameter includes a quantum imaginary-time parameter. The method further includes updating a quantum circuit parameter of the quantum circuit according to the updated quantum system parameter to obtain an updated quantum system, and determining a final quantum state of the quantum system as a minimum eigenstate of the quantum system.

Quantum imaginary-time evolution and quantum real-time control are combined to provide a set of control methods capable of being implemented on imaginary-time evolution, which not only reduces requirements for an initial state and a system, but also reduces requirements for a control capability, provides a strategy of substantial acceleration while achieving flexible selection, and applies control to the imaginary-time Schrödinger equation. Due to a property that its own dynamics converge to a ground state, requirements for the control capability can be reduced, improving an operation speed and accuracy of a quantum computer during quantum computing, and in a controllable state, a convergence process is accelerated as much as possible or requirements for an initial state are reduced.

DESCRIPTION OF EMBODIMENTS

Figure 1:
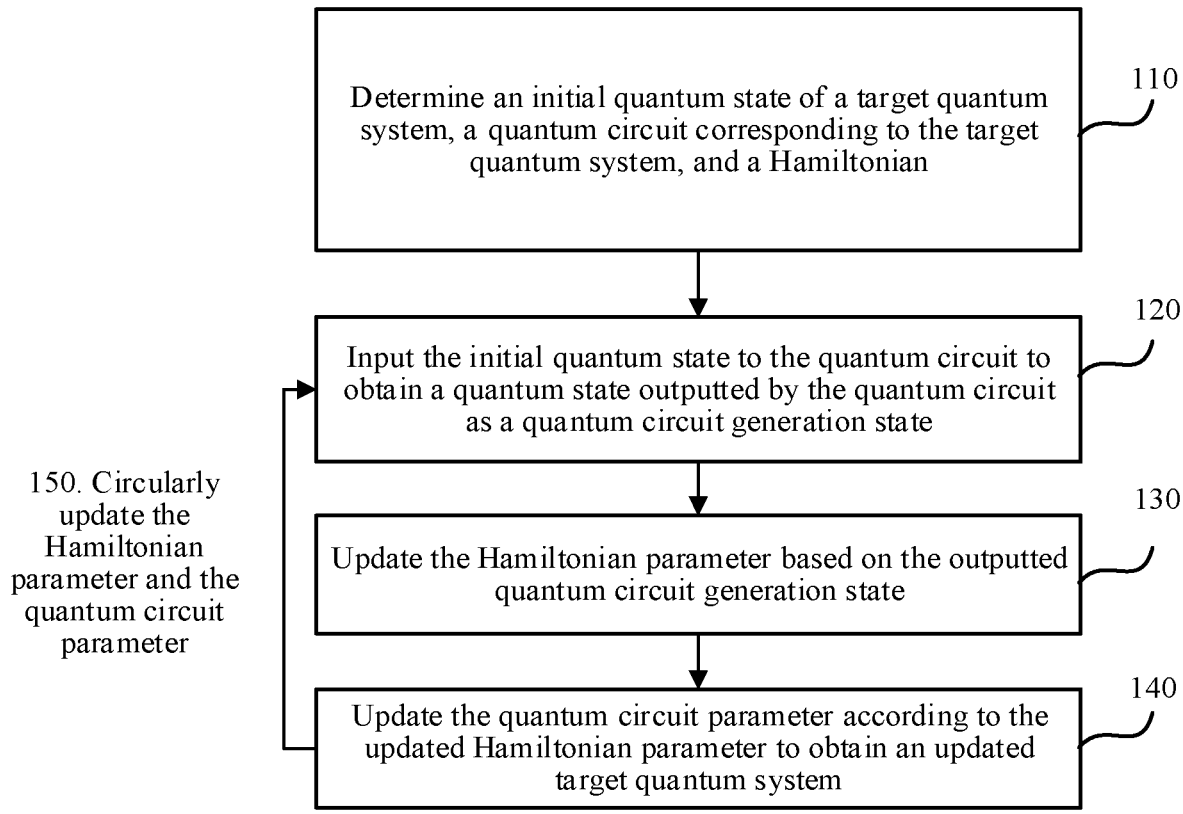
FIG. 1 is a flowchart of a quantum computing method according to an embodiment of this disclosure.

Before the embodiments of this disclosure are introduced and described, some terms involved in this disclosure are first explained and described.

1. Quantum computing: Quantum computing is a computing method based on quantum logic, and a basic unit for storing data is a qubit.
2. Qubit: Qubit is a basic unit of quantum computing. A classical computer uses 0 and 1 as basic units of binary. Differently, quantum computing can simultaneously process 0 and 1, and a system can be in a linear superposition state of 0 and 1:

$$|\psi\rangle = \alpha|0\rangle + \beta|1\rangle,$$

where $\alpha$ and $\beta$ represent complex probability amplitudes of the system at 0 and 1. Their modulo squares $|\alpha|^2$ and $|\beta|^2$ respectively represent probabilities at 0 and 1.

3. Hamiltonian: Hamiltonian is a Hermitian conjugate matrix describing a total energy of a quantum system. Hamiltonian is a physical word, and an operator describing a total energy of a system, usually denoted by H.
4. Quantum state: In quantum mechanics, a quantum state is a microscopic state determined by a set of quantum numbers.
5. Eigenstate: In quantum mechanics, possible values of a mechanical quantity are all eigenvalues of its operator. A state described by an eigenfunction is called an eigenstate of the operator. In its own eigenstate, the mechanical quantity takes a certain value, that is, an eigenvalue to which the eigenstate belongs. For a Hamiltonian matrix H, solutions satisfying the equation $$H|\psi\rangle = E|\psi\rangle$$

corresponds to an eigenstate $|\psi\rangle$ with the lowest energy of a quantum system.

6. Quantum circuit: Quantum circuit is a representation of a quantum general-purpose computer, which represents a hardware implementation of a corresponding quantum algorithm/program in a quantum gate model. If the quantum circuit contains adjustable parameters controlling the quantum gate, it is called a parameterized quantum circuit (PQC) or a variational quantum circuit (VQC), both of which are the same concept.
7. Quantum gate: In quantum computing, especially in a computing model of a quantum circuit, a quantum gate (or a quantum logic gate) is a basic quantum circuit operating a small quantity of qubits.
8. Variational quantum eigensolver (VQE): An estimation of the ground state energy of a specific quantum system implemented through a variational circuit (that is, PQC/VQC) is a typical quantum-classical hybrid computing paradigm, which is widely applied in the field of quantum chemistry.
9. Non-unitary: The so-called unitary matrix is all matrices satisfying $U^\dagger U = I$, and all evolution processes directly allowed by quantum mechanics can be described by the unitary matrix. U is a unitary matrix, and $U^\dagger$ is a conjugate transpose of U. In addition, a matrix that does not satisfy the condition is non-unitary, which can only be implemented experimentally through auxiliary means or even exponentially many resources. However, non-unitary matrices tend to have stronger expressive capability and a faster ground-state projection effect. The foregoing "exponentially many resources" means that a demand for resources increases exponentially with the increase of the quantity of qubits. The exponentially many resources may mean that a total quantity of quantum circuits to be measured is exponentially many, that is, correspondingly, exponentially more computing time is required.
10. Pauli operator: A Pauli operator is also known as a Pauli matrix, and is a set of three 2×2 unitary Hermitian complex matrices (also known as a unitary matrix), generally represented by the Greek letter σ (Sigma). The Pauli X operator is $$\sigma_x = \begin{bmatrix} 0 & 1 \\ 1 & 0 \end{bmatrix},$$

the Pauli Y operator is $$\sigma_y = \begin{bmatrix} 0 & -i \\ i & 0 \end{bmatrix},$$

and the Pauli Z operator is $$\sigma_z = \begin{bmatrix} 1 & 0 \\ 0 & -1 \end{bmatrix}.$$

Obtaining a ground state (that is, a lowest eigenstate) of a quantum system represents obtaining the most stable state of the quantum system, which has quite important applications in the study of basic properties of quantum physics and quantum chemistry systems, solutions of combinatorial optimization issues, and pharmaceutical research. An important application scenario of a quantum computer is to effectively solve or express a ground state of the quantum system. At present, some research institutions and manufacturers are also constantly researching new quantum computers, and are committed to exploring the solution of the ground state.

An introductory description of schemes for obtaining a ground state of a quantum system provided by the related art.

Scheme 1: Obtain a lowest eigenstate based on quantum imaginary-time evolution

Imaginary-time evolution is a basic method for solving a ground state of a quantum system.

A time-dependent Schrödinger equation is:

$$i\hbar \frac{d|\psi(t)\rangle}{dt} = H|\psi(t)\rangle;$$

where H is a Hamiltonian of a target quantum system, $\psi(t)$ represents a quantum state of the target quantum system at time t, and i and $\hbar$ are imaginary-time units, that is, quantum imaginary-time parameters.

The real time t in the time-dependent Schrödinger equation is replaced with imaginary time $$\tau = \frac{i}{\hbar}t,$$

and the foregoing time-dependent Schrödinger equation is rewritten to obtain the following imaginary-time Schrödinger equation:

$$\frac{d|\psi(\tau)\rangle}{d\tau} = -H|\psi(\tau)\rangle$$

In this case, the solution of the imaginary-time Schrödinger equation is:

$$|\psi(\tau)\rangle = e^{-H\tau}|\psi(0)\rangle$$

Due to the non-unitary operator $e^{-H\tau}$, it needs to be normalized:

$$\frac{d|\psi(\tau)\rangle}{d\tau} = -(H - E_\tau)|\psi(\tau)\rangle$$

$$|\psi(\tau)\rangle = A(\tau)e^{-H\tau}|\psi(0)\rangle$$

$$A(\tau) = \frac{1}{\sqrt{\langle\psi(0)|e^{-2H\tau}|\psi(0)\rangle}}$$

where $E_\tau$ represents an eigenvalue at time $\tau$.

A wave function in the imaginary-time Schrödinger equation is expressed by eigenvector expansion as:

$$|\psi(\tau)\rangle = \sum_i c_i |\psi_i(\tau)\rangle = \sum_i e^{-\tau E_i} c_i |\psi_i(0)\rangle$$

where $E_i$ is eigenenergy, $E_0 < E_i$, $E_0$ is ground state energy, and $c_i$ is an expansion coefficient.

Because $E_0 < E_i$, when time approaches infinity, other eigenstates disappear at an exponential speed, that is, with the evolution of $\psi(\tau)$, other states decay faster, leaving only the ground state in the end:

$$\lim_{\tau\to\infty} \frac{\langle\psi(\tau)|c_0\psi_0(\tau)\rangle}{\langle\psi(\tau)|\psi(\tau)\rangle} = \lim_{\tau\to\infty} \frac{c_0^2 e^{-2\tau E_0}}{c_0^2 e^{-2\tau E_0} + \sum_{i=1}^\infty c_i^2 e^{-2\tau E_i}} = 1$$

Therefore, given any wave function, as long as an overlap $c_0$ between the wave function and the lowest eigenstate is not 0, the wave function can be obtained at time $\tau$:

$$\psi(\tau) = c_0 e^{-\tau H} \psi_0(0) + O(e^{-\tau(E_i - E_0)})$$

Therefore, an initial lowest eigenstate can be obtained by inversion:

$$\psi_0(0) = \lim_{\tau\to\infty} \frac{\psi(\tau)}{\langle\psi(\tau)|\psi(\tau)\rangle}$$

Scheme 2: A quantum control method of a real-time time-dependent Schrödinger equation First, the original Hamiltonian in the time-dependent Schrödinger equation is added with the control Hamiltonian to obtain the following quantum dynamics control equation:

$$i\hbar \frac{d|\psi(t)\rangle}{dt} = (H_p + \beta(t)H_d)|\psi(t)\rangle$$

where $H_p$ represents a target Hamiltonian, that is, the original Hamiltonian, $H_d$ represents the control Hamiltonian, and $\beta(t)$ is a time-varying parameter.

On the basis of the foregoing quantum dynamics control equation, according to an output result of the previous unit time $\Delta t$ as a reference, feedback control is designed to minimize $$\langle\psi(t)|H_p|\psi(t)\rangle$$

and the goal is to design $\beta(t)$ to make $$\frac{d}{dt}\langle\psi(t)|H_p|\psi(t)\rangle \leq 0, \forall\, t.$$

According to $$\frac{d}{dt}\langle\psi(t)|H_p|\psi(t)\rangle = \beta(t)\langle\psi(t)|i[H_p, H_d]|\psi(t)\rangle = \beta(t)A(t) \leq 0, \forall\, t$$

it is made that $$\beta(t) = -wf(t, A(t))$$

where $w>0$, $f(t,A(t))$ is any continuous function satisfying $$f(t, A(t)) \times A(t) > 0$$

and for any $A(t)$ not being 0, such as $$f(t, A(t)) = -A(t).$$

Scheme 3: Variational quantum eigensolution based on classical optimization algorithms A variational quantum eigensolver (VQE) is a fault-tolerant quantum algorithm that can run on an NISQ quantum device and can simulate a ground state of a target quantum system.

According to a variational principle, it can be learnt that $$\lambda_0 \le \lambda_\theta = \langle \psi(\overline{\theta}) | H_p | \psi(\overline{\theta}) \rangle$$

and the problem of solving the lowest eigenvector is described as an optimization problem $$\min_{\overline{\theta}} \langle \psi(\overline{\theta}) | H_p | \psi(\overline{\theta}) \rangle.$$

In an embodiment, classical optimization algorithms such as a steepest descent method, a Newton's method, a conjugate direction method are used to solve this optimization problem. The difficulty of the variational quantum eigensolution lies in a design of a quantum circuit. While it is ensured that the quantum circuit can generate a target state, parameter space needs to be as smooth as possible, and the depth of the quantum circuit cannot be too deep to affect the execution of a quantum computer.

However, in the scheme 1 introduced above, the quantum imaginary-time evolution needs to ensure an overlapping relationship between the initial state and the lowest eigenstate and the difference between the remaining eigenvalues and the lowest eigenvalue, and the relationship greatly affects the convergence rate, and the degree of overlap of other eigenstates also affects the effect and speed of the convergence. Normalization of the operators is required for operations on the quantum computer, resulting in additional computational consumption.

In the scheme 2 introduced above, the quantum control method based on the real-time time-dependent Schrödinger equation needs to ensure that the selected control Hamiltonian has a sufficient control capability, and under non-complete control, requirements for the initial state and all the states appearing in the convergence process are extremely high, and if any of the states does not meet controllable conditions, it may fail to converge.

In the scheme 3 introduced above, the implementation of the variational quantum eigensolution based on the classical optimization algorithms is relatively simple on the quantum computer, and fewer measurements are required for a single update of the parameters, but as the size of the system increases, problems of a proposed quantum circuit design and barren plateau optimization appear.

This disclosure provides a brand-new technical solution, which applies control to the imaginary-time time-dependent Schrödinger equation. Due to a property that its own dynamics converge to a ground state, requirements for the control capability can be reduced, and in a controllable state, a convergence process is accelerated as much as possible or requirements for an initial state are reduced. With an assistance of quantum control, requirements for each condition can be reduced and time required for convergence can be reduced, while overall computing resources can be reduced by a small or no increase in computing resources originally required for each step. The approximation of parameter updates to dynamics is used for updating the barren plateau problem of the parameter classical optimization algorithms and reducing design requirements for the proposed quantum circuit.

Before the method embodiments of this disclosure are introduced, an execution environment of the method of this disclosure is first introduced and described.

The quantum computing method provided in the embodiments of this disclosure can be implemented by a classical computer (such as a PC). For example, the method is implemented through executing a corresponding computer program by a classical computer; or the method may be performed in a hybrid device environment of a classical computer and a quantum computer, for example, the method is implemented through the cooperation of the classical computer and the quantum computer. For example, the quantum computer is configured to implement solutions of eigenstates in the embodiments of this disclosure, and the classical computer is configured to implement other steps except the problem of solving the eigenstates in the embodiments of this disclosure.

In the following method embodiments, for ease of description, the description is given by merely using a computer device as an execution entity of the steps. It is to be understood that the computer device may be a classical computer, or may be a hybrid execution environment including a classical computer and a quantum computer, which is not limited in the embodiments of this disclosure.

FIG. 1 is a flowchart of a quantum computing method according to an embodiment of this disclosure. The description is given by taking an example in which an execution body of steps of the method is a computer device. The method may include the following steps:

Step 110. Determine an initial quantum state of a target quantum system, a quantum circuit corresponding to the target quantum system, and a Hamiltonian used for describing the target quantum system, the quantum circuit including a quantum circuit parameter, the Hamiltonian including a Hamiltonian parameter, and the Hamiltonian parameter including a quantum imaginary-time parameter.

The initial quantum state is an input state used for being inputted to the target quantum system to obtain an output quantum state of the current target quantum system.

The quantum circuit corresponding to the target quantum system is a quantum circuit used by the target quantum system during quantum computing, that is, the transformation of the initial quantum state through the quantum circuit is used as the quantum computing process of the initial quantum state.

The quantum circuit parameter is a transformation parameter corresponding to each transformation node in the quantum circuit, and transformation is performed on the quantum state according to the quantum circuit parameter, thereby implementing different quantum computing processes of different quantum circuits.

In this embodiment, the Hamiltonian used for describing the target quantum system includes an original Hamiltonian and a control Hamiltonian. The original Hamiltonian is used for providing an evolution trend, and the control Hamiltonian is used for providing an additional evolution trend controlling an evolution process. In addition, the Hamiltonian includes a Hamiltonian parameter, and the Hamiltonian parameter includes a quantum imaginary-time parameter.

In an embodiment, the Hamiltonian describes the target quantum system with a quantum dynamics expression. The quantum dynamics expression includes the original Hamiltonian and the control Hamiltonian.

Step 120. Input the initial quantum state to the quantum circuit to obtain a quantum state outputted by the quantum circuit as a quantum circuit generation state of the target quantum system. For example, the initial quantum state is input to a quantum circuit corresponding to the quantum system and a quantum state outputted by the quantum circuit is obtained. The outputted quantum state is a quantum circuit generation state corresponding to the quantum system.

The quantum circuit generation state refers to a quantum state that is outputted by inputting the initial quantum state to a quantum circuit structure of the target quantum system, and performing transformation on the quantum circuit structure.

Step 130. Update the Hamiltonian parameter based on the outputted quantum circuit generation state. For example, a quantum system parameter (e.g., Hamiltonian parameter) is updated based on the outputted quantum circuit generation state. The quantum system parameter comprises a quantum imaginary-time parameter.

In some embodiments, an eigenstate corresponding to the target quantum system can be obtained according to the quantum circuit generation state of the target quantum system, to adjust the Hamiltonian parameter with a goal of minimizing the eigenstate. In some embodiments, the quantum circuit generation state of the target quantum system is used for approximately representing the eigenstate of the target quantum system.

In some embodiments, the quantum dynamics expression is a dynamic expression obtained by replacing real time in the time-dependent Schrödinger equation with imaginary time, and adding the control Hamiltonian based on the original Hamiltonian.

For example, the Hamiltonian used for describing the target quantum system with the quantum dynamics expression is as follows:

$$\frac{d|\psi(\tau)\rangle}{d\tau} = -(H_p + \beta(\tau)H_d)|\psi(\tau)\rangle$$

where $\tau$ represents the quantum imaginary-time parameter, $|\omega(\tau)\rangle$ represents an imaginary-time eigenstate, $H_p$ represents the original Hamiltonian, $H_d$ represents the control Hamiltonian, and $\beta(\tau)$ represents the Hamiltonian parameter.

Next, a design idea of the Hamiltonian parameter $\beta(\tau)$ is introduced. The Hamiltonian parameter is determined based on a first-order partial derivative requirement of a Lyapunov function with respect to time.

In this embodiment, $\beta(\tau)$ needs to be designed to control the evolution of the target quantum system to the lowest eigenstate. A design idea of the $\beta(\tau)$ function may be provided through the Lyapunov function. First, the Lyapunov function based on an average value is as follows:

$$V(\psi(\tau)) = \langle \psi(\tau)|(H_p - E_0)|\psi(\tau)\rangle$$

where $E_0$ is a minimum eigenvalue of $H_p$, so that $H_p - E_0$ is a positive semi-definite matrix, which can be obtained by a first-order partial derivative of the Lyapunov function with respect to time:

$$\dot{V}(\psi(\tau)) = 2(\langle H_p^2 \rangle - \langle H_p \rangle^2) - \beta(\tau)(\langle \psi(\tau)|\{H_d, H_p\}|\psi(\tau)\rangle - 2\langle H_d \rangle \langle H_p \rangle) \leq 0$$

where $$2(\langle H_p^2 \rangle - \langle H_p \rangle^2)$$

is used for representing an evolution trend provided by the original Hamiltonian, and $$2(\langle H_p^2 \rangle - \langle H_p \rangle^2)$$

is less than or equal to 0; and $$\beta(\tau)(\langle \psi(\tau)|\{H_d, H_p\}|\psi(\tau)\rangle - 2\langle H_d \rangle \langle H_p \rangle)$$

is used for representing an additional evolution trend provided by the control Hamiltonian.

Since $$2(\langle H_p^2 \rangle - \langle H_p \rangle^2)$$

is less than or equal to 0, in some embodiments, the Hamiltonian parameter is as follows:

$$\beta(\tau) = (\langle \psi(\tau)|\{H_d, H_p\}|\psi(\tau)\rangle - 2\langle H_d \rangle \langle H_p \rangle)$$

Therefore, it is ensured that $$\beta(0) = 0 \text{ and } \dot{V}(\psi(\tau)) \leq 0, \forall \tau > 0.$$

In this case, critical points of the control function are all eigenstates, of which the maximum value corresponds to the eigenstate of the largest eigenvalue, the minimum value corresponds to the eigenstate of the smallest eigenvalue, and the remaining eigenstates are transition states. In this case, from the perspective of the control method, the initial state needs to be as close to the target eigenstate as much as possible to achieve a control purpose.

On the other hand, since an imaginary-time evolution process converges to the current lowest energy eigenstate at an exponential speed, complementary acceleration can be achieved by adjusting properties of the two. The convergence speed of the quantum computer during quantum computing is improved, thereby improving operation efficiency of quantum computing.

Step 140. Update the quantum circuit parameter according to the updated Hamiltonian parameter to obtain an updated target quantum system. For example, a quantum circuit parameter of the quantum circuit is updated according to the updated quantum system parameter (e.g., Hamiltonian parameter) to obtain an updated quantum system.

In an embodiment, on the basis of approximate simulation of imaginary-time dynamic function evolution based on a variational algorithm architecture, according to the McLachlan variational principle:

$$\delta \left\| \left( \frac{\partial}{\partial \tau} + H - E_\tau \right) |\psi(\tau)\rangle \right\| = 0$$

It can be obtained that quantum circuit parameters of a wave function changing over time are:

$$\sum_j A_{ij} \dot{\theta}_j = c_i$$

$$A_{ij} = R \left\{ \frac{\langle \partial \phi(\tau) |}{\partial \theta_i} \frac{|\partial \phi(\tau)\rangle}{\partial \theta_j} \right\}$$

$$c_i = R \left( -\sum_\alpha \lambda_\alpha \frac{\langle \partial \phi(\tau) |}{\partial \theta_i} h_\alpha |\partial \phi(\tau)\rangle \right)$$

where $\phi(\tau)$ represents an eigenstate, and $\theta_i$ represents an $i^{th}$ quantum circuit parameter.

Therefore, the quantum circuit parameter corresponding to the target quantum system is updated according to the updated Hamiltonian parameter.

Step 150. Circularly update the Hamiltonian parameter and the quantum circuit parameter until energy of the target quantum system is a minimum value, the minimum value corresponding to a final quantum state of the target quantum system; and determine the final quantum state as a minimum eigenstate of the target quantum system.

Figure 2:
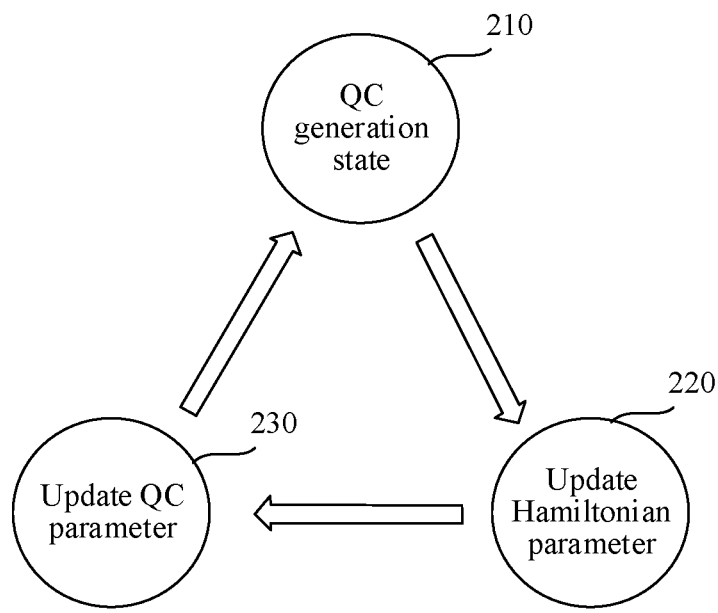
FIG. 2 is a schematic diagram of an update process of a Hamiltonian parameter according to an exemplary embodiment of this disclosure.

For example, FIG. 2 is a schematic diagram of an update process of a Hamiltonian parameter according to an exemplary embodiment of this disclosure. As shown in FIG. 2, the cyclic process mainly includes three parts:

a quantum circuit generation state 210, updating the Hamiltonian parameter 220, and updating the quantum circuit parameter 230.

In the progress of the quantum circuit generation state 210, outputted by inputting an initial state is inputted to a quantum circuit structure, and transformation is performed on the initial state through the quantum circuit structure, to output a quantum state as the quantum circuit generation state.

After a corresponding eigenstate is determined according to the quantum circuit generation state 210, the process of updating the Hamiltonian parameter 220 is performed with a goal of minimizing the eigenstate, to adjust the Hamiltonian parameter.

Based on the adjusted Hamiltonian parameter, the process of updating the quantum circuit parameter 230 is performed to correspondingly update the quantum circuit parameter of the target quantum system.

The foregoing three processes form a loop until convergence to the minimum eigenstate.

To sum up, the quantum computing method provided in the embodiments of this disclosure combines quantum imaginary-time evolution and quantum real-time control theory, and provides a set of control methods that are capable of being implemented on the imaginary-time evolution by analyzing the mechanisms of the two, which not only reduces requirements for an initial state and a system, but also reduces requirements for a control capability, provides a strategy of substantial acceleration while achieving flexible selection, and applies control to the imaginary-time Schrödinger equation. Due to a property that its own dynamics converge to a ground state, requirements for the control capability can be reduced, improving an operation speed and accuracy of the quantum computer during quantum computing, and in a controllable state, a convergence process is accelerated as much as possible or requirements for an initial state are reduced.

In the method provided in the embodiments of this disclosure, real time in the time-dependent Schrödinger equation is replaced with imaginary time. Due to a property that dynamics of the imaginary-time itself converge to a ground state, requirements for the control capability can be reduced, and in a controllable state, a convergence process is accelerated as much as possible or requirements for an initial state are reduced. In addition, with an assistance of quantum control, requirements for each condition can be reduced and time required for convergence can be reduced, while overall computing resources can be reduced by reducing or not increasing computing resources of the quantum computer originally required for each step.

In the method provided in the embodiments of this disclosure, according to the definition of the control capability, it is necessary to ensure that the target Hamiltonian and the control Hamiltonian are generation groups under the Lie algebra. In this embodiment, as long as the control capability is partially controllable under imaginary time, due to a property that its dynamics converge to the lowest eigenstate, key control can be achieved by using the partial controllability, which can accelerate the overall operation of the quantum computer and reduce the additional operation of the overall control. The main control idea is to make an adjustment according to a distance from the eigenstate. A property of the evolution itself and the additional guidance provided by the control provide their own advantages in different situations to achieve stable acceleration and reduce dependence on the selection of the system and the initial state.

Figure 3:
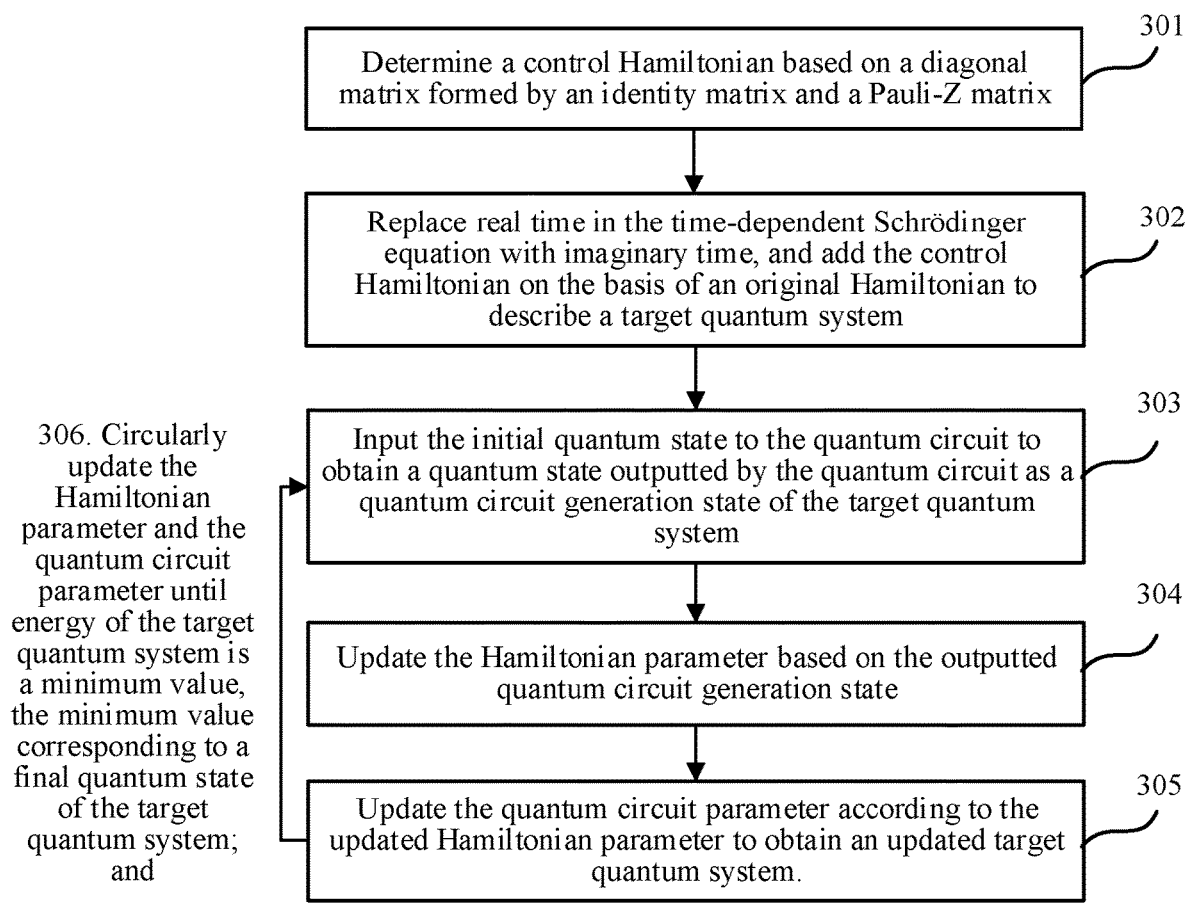
FIG. 3 is a flowchart of a quantum computing method according to another embodiment of this disclosure.

In some embodiments, in addition to the design of the foregoing $\beta(\tau)$ function, the selection of the control Hamiltonian also greatly affects the convergence process. FIG. 3 is a flowchart of a quantum computing method according to another exemplary embodiment of this disclosure. An execution body of steps of the method may be a computer device. The method may include the following steps:

Step 301. Determine a control Hamiltonian based on a diagonal matrix formed by an identity matrix and a Pauli-Z matrix.

In the selection of the control Hamiltonian, an intuitive reference is from the perspective of the control capability. Selecting a set of control operators with complete control capability can theoretically converge to any state.

In the foregoing scheme 1 for obtaining the ground state of the quantum system, the complete control capability of the normalized imaginary-time evolution after Trotter decomposition is:

$$\psi(\tau) = A(\tau) e^{-H\tau} \psi(0) \approx A(\tau) e^{-\Delta\tau\beta(n)H_d} e^{-\Delta\tau H_p} \ldots e^{-\Delta\tau\beta(0)H_d} e^{-\Delta\tau H_p} \psi \quad (0)$$

It can be known from the Baker-Campbell-Hausdorff formula that when $\Delta\tau$ is sufficiently small, assuming that $H_d$ and $H_p$ and their iterative commutators can expand the entire Lie group, any unitary transformation can be represented by this set of objective operators and control operators.

In real-time quantum control, if a control operator with a poor control capability is selected, a required unitary operator may not be generated, and the convergence process converges to an uncontrollable region. However, its own dynamics property in imaginary-time evolution provides that as long as an overlap between the initial state and the eigenstate is not 0, there is bound to be a set of path states converging to the target state. If the control operator intends to achieve an effect of acceleration, it only needs to provide reasonable control in its controllable region, which not only accelerates the convergence speed of the original imaginary-time evolution, but also designs its control capability to provide an evolution path for the imaginary-time evolution to converge in a region where the imaginary and real dynamics cannot converge, such as an overlap of 0.

According to the definition of the control capability, it is necessary to ensure that the original Hamiltonian and the control Hamiltonian are generation groups under the Lie algebra. However, as the system increases, how to select an appropriate control Hamiltonian and unit discrete time to make it sufficiently approximate a dynamical evolution process is a difficult problem.

In this embodiment of this disclosure, as long as the control capability is partially controllable under imaginary time, due to a property that its dynamics converge to the lowest eigenstate, key control can be achieved by using the partial controllability, which can achieve the overall acceleration and reduce the additional operation of the overall control. The main control idea is to make an adjustment according to a distance from the eigenstate. A property of the evolution itself and the additional guidance provided by the control provide their own advantages in different situations to achieve stable acceleration and reduce dependence on the selection of the system and the initial state.

According to a first derivative of the Lyapunov function, it can be observed that a trend of the dynamical evolution itself and an additional trend provided by the control are:

$$D_p(\psi(\tau)) = 2(\langle H_p \rangle^2 - \langle H_p^2 \rangle)$$

$$D_d(\psi(\tau)) = \beta(\tau)(\langle \psi(\tau) | \{H_d, H_p\} | \psi(\tau) \rangle - 2\langle H_d \rangle \langle H_p \rangle)$$

The difference between a non-lowest eigenvalue and the lowest eigenvalue in the original dynamics convergence affects the convergence rate. In this case, a convergence trend $D_p$ that $H_p$ itself can provide is not as obvious as a system with a large difference, and $H_d$ can provide an additional convergence trend $D_d$ to accelerate the convergence of the system.

However, when $\psi(\tau)$ approaches eigenstates of $H_p$, $D_p$ and $D_d$ are closer to zero. In this case, compared with $D_p$, $D_d$ has a property that all eigenstates are critical points, which may lead to a situation that the lowest eigenstate accounts for too little and converges to other eigenstates during an evolution process. In addition, $D_d$ also tends to be zero around the eigenstates of $H_d$. Therefore, it is necessary to determine when it is suitable for $D_d$ to provide evolutionary power or to avoid the problem by a selection of $H_d$ to make it less controllable around the eigenstates. In this project, a diagonal matrix formed by an identity matrix and a Pauli-Z matrix is selected as an option of the control operator, which is a kinetic energy term of a single electron and a force of an atomic nucleus on the single electron under the Jordan-Wigner transformation. In addition, $D_p$ further has a property of containing other current states. Assuming that all eigenvalues are real numbers, it can be obtained by first expanding the eigenstates:

$$D_p(\psi(\tau)) = 2((c_0^2 \lambda_0 + \ldots + c_n^2 \lambda_n)^2 - (c_0 \lambda_0^* \langle E_0 | + \ldots + c_n \lambda_n^* \langle E_n |)(c_0 \lambda_0 | E_0 \rangle +$$

-continued
$$\ldots + c_n \lambda_n | E_n \rangle)) =$$
$$(c_0^4 \lambda_0^2 + c_1^4 \lambda_1^2 + \ldots + 2c_0^2 c_1^2 \lambda_0 \lambda_1 + \ldots) - (c_0^2 \lambda_0^2 + c_1^2 \lambda_1^2 + \ldots)$$

Assuming current convergence to the superposition of two eigenstates $|E0\rangle$ and $|Ek\rangle$, the foregoing formula is:

$$D_p(\psi(\tau)) = (c_0^4 \lambda_0^2 + c_k^4 \lambda_k^2 + 2c_0^2 c_k^2 \lambda_0 \lambda_k) - (c_0^2 \lambda_0^2 + c_k^2 \lambda_k^2)$$
$$= (c_0^4 - c_0^2) \lambda_0^2 + (c_k^4 - c_k^2) \lambda_k^2 + 2c_0^2 c_k^2 \lambda_0 \lambda_k$$
$$= (c_0^4 - c_0^2) \lambda_0^2 + \lambda_k (c_0^2 c_k^2 \lambda_0 + (c_k^4 - c_k^2) \lambda_k)$$

Since $\lambda_0$ is the lowest energy and the value is negative, when $|Ek\rangle$ is closer to the lowest eigenstate, its energy $\lambda_k$ is also more negative, and the value of $D_p$ is smaller under the same $C_k$. Therefore, under the same fidelity, the value of $D_p$ may also vary. When the size of $D_p$ is used as a reference for the control truncation, the control operator is more easily triggered when the proportion of mixed states is mostly high energy states under the same fidelity. Therefore, for different systems and initial states, different designs can be used for achieving an effect of acceleration or control.

By combining the dynamic phenomena of $H_p$ and $H_d$ in different states, the system can control the eigenstate evolution. The quantum system is stabilized near a target state by regulation to achieve a goal of convergence towards the target, and the residence time in a non-target range has achieved fast and controllable convergence, and ideas obtained by all eigenstates except the lowest eigenstate are provided. For example, if the impact of the control operator is amplified around the eigenstate, the system converges to the vicinity of this eigenstate. When an overlap between the converged state and all low-energy eigenstates with energy less than this eigenstate is sufficiently small, the original imaginary-time evolution tends to converge to this eigenstate. In addition, due to the combination of the dynamic phenomena of $H_p$ and $H_d$ in different states, the quantum system is stabilized near the target state by the regulation of $H_d$, thereby improving the stability and reliability of the quantum computer during quantum computing.

Step 302. Replace real time in the time-dependent Schrödinger equation with imaginary time, and add the control Hamiltonian on the basis of an original Hamiltonian to describe a target quantum system.

Step 303. Input an initial quantum state to a quantum circuit to obtain a quantum state outputted by the quantum circuit as a quantum circuit generation state of the target quantum system.

The quantum circuit generation state refers to a quantum state that is outputted by inputting the initial quantum state to a quantum circuit structure of the target quantum system, and performing transformation on the quantum circuit structure.

Step 304. Update a Hamiltonian parameter based on the outputted quantum circuit generation state.

Figure 4:
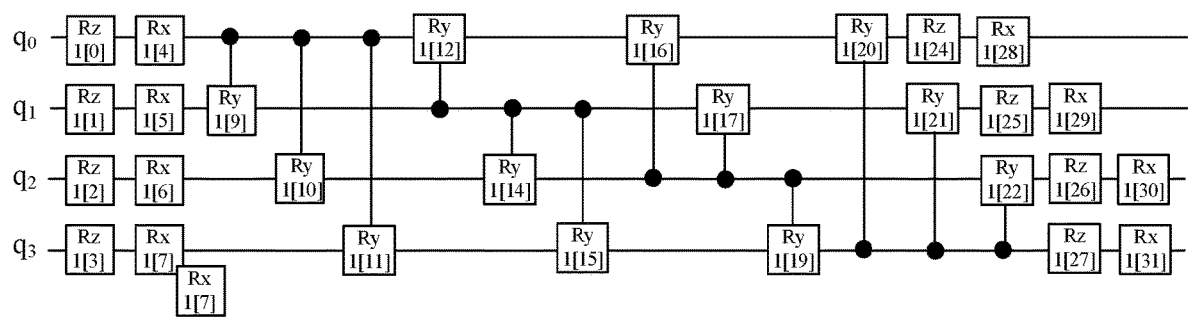
FIG. 4 is a schematic diagram of a quantum circuit according to an embodiment of this disclosure.

For example, the foregoing algorithm is approximated by a variational quantum eigensolution in each discrete time to avoid generating a deeper Trotter circuit, and the dynamic convergence process can also be used to avoid convergence problems of traditional optimizers. First, a quantum circuit with better performance is selected, for example, as the quantum circuit 410 shown in FIG. 4, to avoid approximation errors caused by poor performance of the quantum circuit itself. Then, the quantum circuit parameter is updated with the change of the quantum circuit parameter over time, and the Hamiltonian parameter is updated with a design of imaginary-time control.

Step 305. Update the quantum circuit parameter according to the updated Hamiltonian parameter to obtain an updated target quantum system.

Step 306. Circularly update the Hamiltonian parameter and the quantum circuit parameter until energy of the target quantum system is a minimum value, the minimum value corresponding to a final quantum state of the target quantum system; and determine the final quantum state as a minimum eigenstate of the target quantum system.

To sum up, the quantum computing method provided in the embodiments of this disclosure combines quantum imaginary-time evolution and quantum real-time control theory, and provides a set of control methods that capable of being implemented on the imaginary-time evolution by analyzing the mechanisms of the two, which not only reduces requirements for an initial state and a system, but also reduces requirements for the control capability, provides a strategy of substantial acceleration while achieving flexible selection, and applies control to the imaginary-time Schrödinger equation. Due to a property that its own dynamics will converge to a ground state, requirements for the control capability can be reduced, improving an operation speed and accuracy of the quantum computer during quantum computing, and in a controllable state, a convergence process is accelerated as much as possible or requirements for an initial state are reduced.

The method provided in this embodiment proves its significant acceleration property in numerical simulation, and improves the performance of imaginary-time evolution in a case that the eigenenergy difference is too small or it is difficult to select the initial state, improving the operation speed and operation accuracy of the quantum computer during quantum computing.

An approximate means of solving variational quantum eigenvalues is provided, making it possible to replace a classical optimizer in variational algorithms, implementing the executability on a short-term quantum computer. The control method is used to provide a noise-resistant capability, improving the convergence speed and operation accuracy of the quantum computer during quantum computing, and improving the stability and reliability of the quantum computer during quantum computing.

Therefore, from a perspective of quantum control: (1) The process of quantum imaginary-time evolution corresponding to the quantum computer can be accelerated; (2) The robustness of the quantum computer to noise can be increased; (3) The impact of the initial state on the imaginary-time evolution dynamics can be reduced; (4) How to use variational quantum eigensolution to approximate the quantum control process to operate on near-term quantum hardware.

Figure 5:
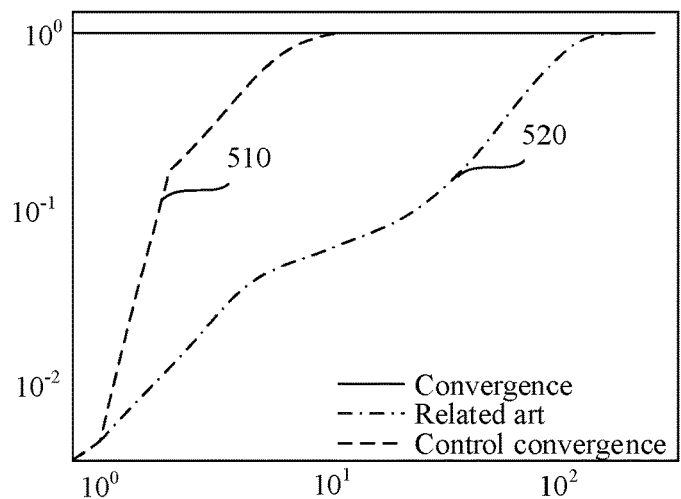
FIG. 5 is a schematic diagram of evolution convergence according to an embodiment of this disclosure.

For example, beneficial effects produced by the methods provided in the embodiments of this disclosure are as follows:

1. Accelerate Ground State Convergence for Systems with Small Energy Differences Simulation calculation is performed with 8 qubits in a system with HF molecular bond length of 2 Å, and a huge speedup can be seen in the simulation with an initial state as the maximum homogeneous mixed state. Because an energy gap between a first excited state (a second low energy eigenstate) and a ground state (a lowest energy eigenstate) in the system is too small, $\Delta E=0.015$ hartree, an exponential convergence advantage of the original imaginary-time evolution dynamics cannot be well represented in a few steps. In this case, an additional control term makes a regulation in a small quantity of steps to achieve a convergence path that quickly brings the initial state to the ground state. For example, as shown in FIG. 5, a control convergence speed curve 510 of the method provided in this embodiment of this disclosure is obviously better than the convergence speed curve 520 in the related art. The convergence speed of the quantum computer during quantum computing is improved, thereby improving its overall operation speed.

2. Reduce Dependence on the Selection of an Initial State for Imaginary-Time Evolution When the system is increased or complex, the fidelity of the selected initial state and a lowest eigenstate cannot be guaranteed. A smaller fidelity at this time may affect the convergence speed of original imaginary-time evolution. However, in the embodiments of this disclosure, additional control is added to accelerate the process of the amplification of the lowest eigenstate, thereby reducing burden on the selection of the initial state.

Figure 6:
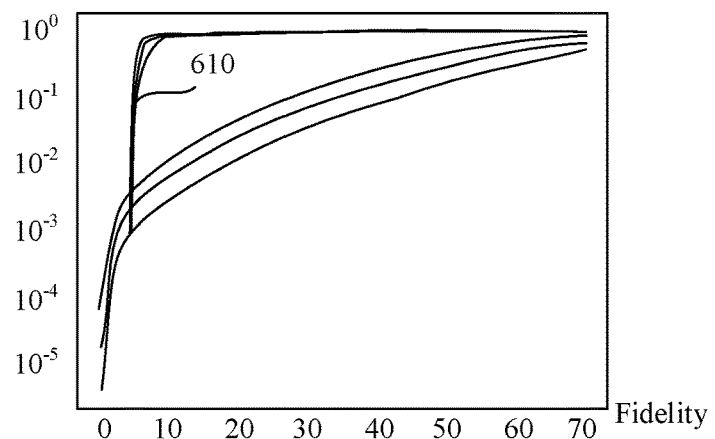
FIG. 6 is a schematic diagram of a convergence process of initial state evolution with different fidelities in an HF system according to an embodiment of this disclosure.

FIG. 6 presents a convergence process of initial state evolution with different fidelities in an HF system. Since the control operator is set as switch activation, there are obvious discontinuous turning points, but it can be seen that the curve 610 after the control operator intervenes in the system significantly shortens the convergence time. Especially when the fidelity of the initial state and the ground state is lower, the improvement is more significant, and the time for intervening in the system is not long, and overall resource consumption is hardly increased. In addition, resource requirements of the quantum computer in the quantum computing process are reduced.

3. Compared with a Real-Time Quantum Control System, Reduce Control Operator Requirements and a Quantity of Control Steps In real-time quantum control, selecting a control operator with a poor control capability causes some states to be uncontrollable and fail to converge. However, in imaginary-time quantum control, due to the dynamics of imaginary-time evolution itself, the control operator is not the only power source making the system converge as in real-time quantum control.

Figure 7:
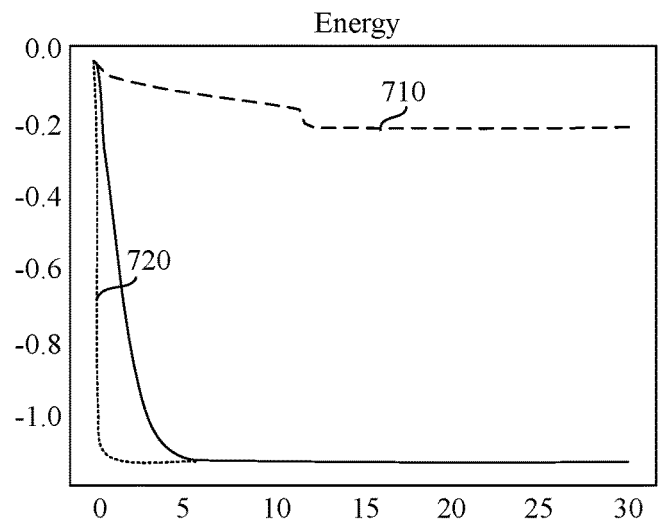
FIG. 7 is a schematic diagram of an energy convergence result according to an embodiment of this disclosure.

In this case, it is only necessary to determine when to use the selected control operator to accelerate the system convergence. In addition, the real-time control converges in a range uncontrollable to the control operator, and the range cannot be guaranteed to be around the target state, unless the control operator has complete control capability. FIG. 7 shows an energy convergence result of a system with $H_2$ bond length of 0.74 Å. It can be clearly seen that at the initial state of maximum uniform mixing and the diagonal series control operator $H_d$, a real-time control curve 710 converges to its uncontrollable range, and an imaginary-time control curve 720 not only converges faster than the imaginary-time evolution, but also does not have high requirements on the control capability as the real time evolution does.

4. Have Better Performance in a Noise System

Figure 8:
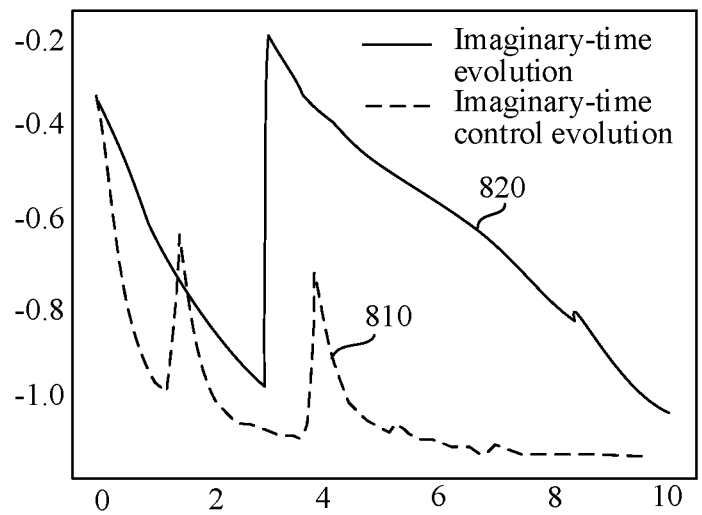
FIG. 8 is a schematic diagram of convergence of simulating imaginary-time evolution and imaginary-time control in a noise system according to an embodiment of this disclosure.

FIG. 8 shows convergence of simulating imaginary-time evolution and imaginary-time control in a noise system according to an embodiment of this disclosure. It can be clearly seen that when the noise causes bounce. Since the imaginary-time control can converge faster, the overall energy can also converge to the target energy eventually, as shown in the curve 810 and the curve 820 in FIG. 8.

In the embodiments of this disclosure, a further description is provided by taking the use of a control method to implement imaginary-time evolution as an example. In some embodiments, non-control methods such as designing dynamic unit imaginary time dt or using deep learning can also be used to accelerate the convergence and noise resistance of imaginary-time evolution.

Figure 9:
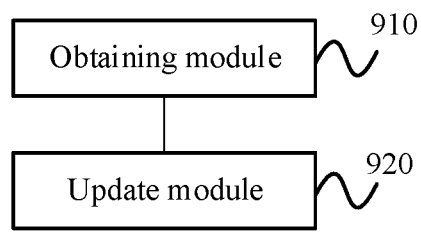
FIG. 9 is a block diagram of a quantum computing apparatus according to an embodiment of this disclosure.

FIG. 9 is a schematic structural diagram of a quantum computing apparatus according to an exemplary embodiment of this disclosure. The apparatus includes:

an obtaining module 910, configured to determine an initial quantum state of a target quantum system, a quantum circuit corresponding to the target quantum system, and a Hamiltonian used for describing the target quantum system, the quantum circuit including a quantum circuit parameter, the Hamiltonian including a Hamiltonian parameter, and the Hamiltonian parameter comprising a quantum imaginary-time parameter; and input the initial quantum state to the quantum circuit to obtain a quantum state outputted by the quantum circuit as a quantum circuit generation state of the target quantum system; and an update module 920, configured to update the Hamiltonian parameter based on the outputted quantum circuit generation state.

The update module 920 is further configured to update the quantum circuit parameter according to the updated Hamiltonian parameter to obtain an updated target quantum system.

The update module 920 is further configured to circularly update the Hamiltonian parameter and the quantum circuit parameter until energy of the target quantum system is a minimum value, the minimum value corresponding to a final quantum state of the target quantum system; and determine the final quantum state as a minimum eigenstate of the target quantum system.

In an embodiment, the Hamiltonian used for describing the target quantum system includes an original Hamiltonian and a control Hamiltonian, the original Hamiltonian is used for providing an evolution trend, and the control Hamiltonian is used for providing an additional evolution trend controlling an evolution process.

In an embodiment, the Hamiltonian used for describing the target quantum system is as follows:

$$\frac{d|\psi(\tau)\rangle}{d\tau} = -(H_p + \beta(\tau)H_d)|\psi(\tau)\rangle$$

where $\tau$ represents the quantum imaginary-time parameter, $|\Psi(\tau)\rangle$ represents an imaginary-time eigenstate, $H_p$ represents the original Hamiltonian, $H_d$ represents the control Hamiltonian, $\beta(\tau)$ and represents the Hamiltonian parameter.

In an embodiment, the Hamiltonian parameter is determined based on a first-order partial derivative requirement of a Lyapunov function with respect to time.

In an embodiment, the first-order partial derivative requirement of the Lyapunov function with respect to time is as follows:

$$\dot{V}(\psi(\tau)) = 2(\langle H_p^2\rangle - \langle H_p\rangle^2) - \beta(\tau)(\langle\psi(\tau)|\{H_d, H_p\}|\psi(\tau)\rangle - 2\langle H_d\rangle\langle H_p\rangle) \le 0$$

where $$2(\langle H_p^2\rangle - \langle H_p\rangle^2)$$

is used for representing the evolution trend provided by the original Hamiltonian, and $$2(\langle H_p^2\rangle - \langle H_p\rangle^2)$$

is less than or equal to 0; and $$\beta(\tau)(\langle\psi(\tau)|\{H_d, H_p\}|\psi(\tau)\rangle - 2\langle H_d\rangle\langle H_p\rangle)$$

is used for representing the additional evolution trend provided by the control Hamiltonian.

In an embodiment, the Hamiltonian parameter is as follows:

$$\beta(\tau) = (\langle\psi(\tau)|\{H_d, H_p\}|\psi(\tau)\rangle - 2\langle H_d\rangle\langle H_p\rangle)$$

Figure 10:
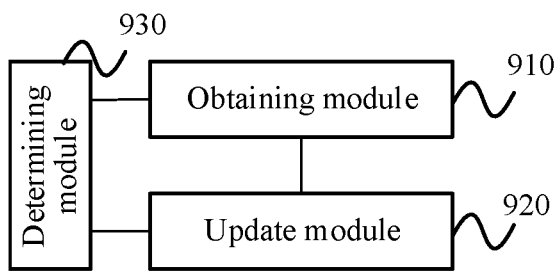
FIG. 10 is a block diagram of a quantum computing apparatus according to another embodiment of this disclosure.

In an embodiment, as shown in FIG. 10, the apparatus further includes:

a determining module 930, configured to determine the control Hamiltonian based on a diagonal matrix formed by an identity matrix and a Pauli-Z matrix.

In an embodiment, the update module 920 is further configured to update the Hamiltonian with a goal of minimizing the energy of the target quantum system.

To sum up, the quantum computing apparatus provided in the embodiments of this disclosure combines quantum imaginary-time evolution and quantum real-time control theory, and provides a set of control methods that capable of being implemented on the imaginary-time evolution by analyzing the mechanisms of the two, which not only reduces requirements for an initial state and a system, but also reduces requirements for a control capability, provides a strategy of substantial acceleration while achieving flexible selection, and applies control to the imaginary-time Schrödinger equation. Due to a property that its own dynamics converge to a ground state, requirements for the control capability can be reduced, improving an operation speed and accuracy of the quantum computer, and in a controllable state, a convergence process is accelerated as much as possible or requirements for an initial state are reduced.

The quantum computing apparatus provided in the foregoing embodiments is merely illustrated with an example of division of the functional modules. In practical application, the function distribution may be implemented by different functional modules according to requirements, that is, an internal structure of the device is divided into different functional modules, to implement all or some of the functions described above. In addition, the quantum computing apparatus provided in the foregoing embodiments and the quantum computing method embodiments belong to the same conception. For the specific implementation process, reference may be made to the method embodiments, and details are not described herein again.

Figure 11:
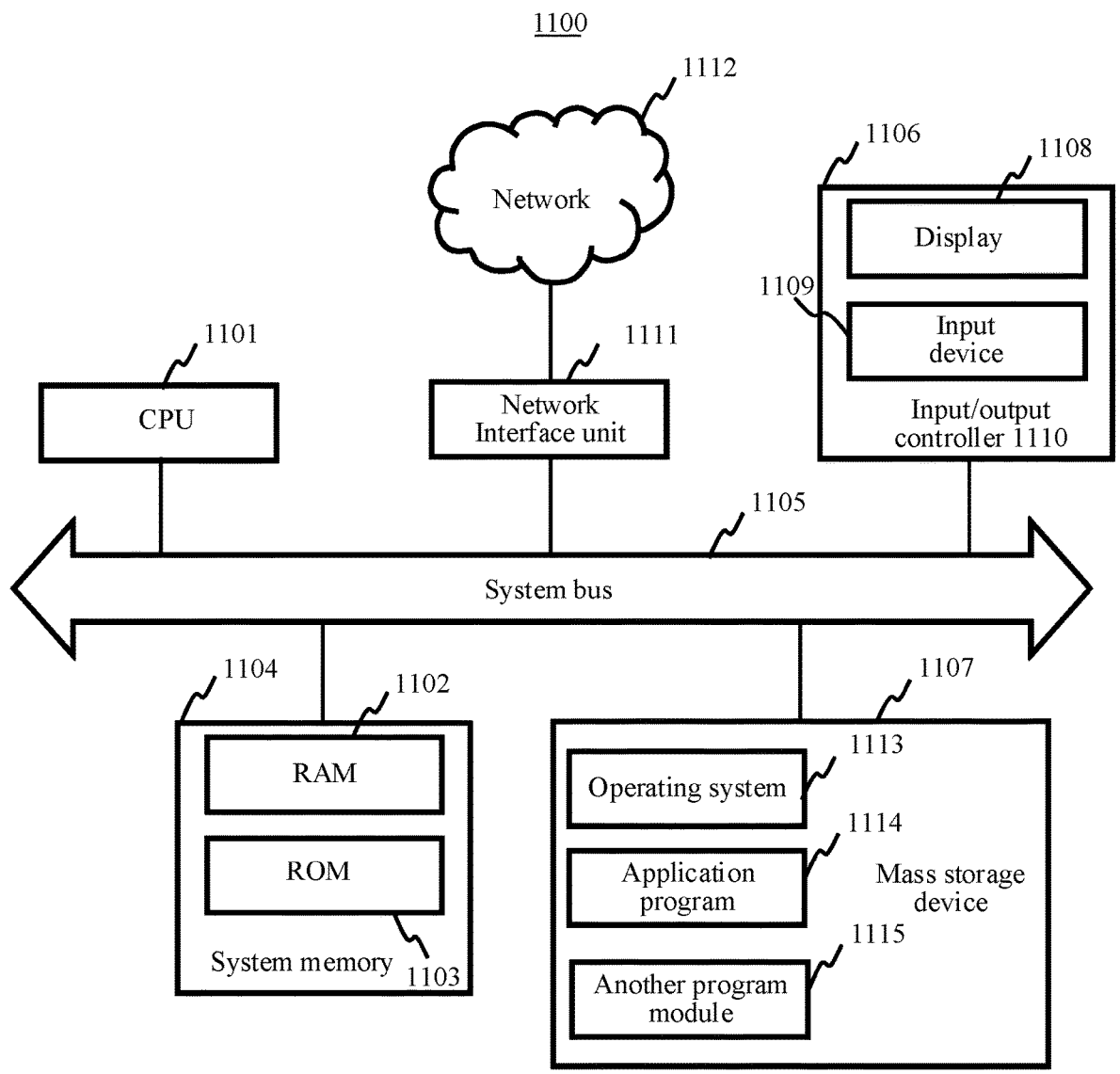
FIG. 11 is a structural block diagram of a computer device according to an embodiment of this disclosure.

FIG. 11 is a structural block diagram of a computer device 1100 according to an embodiment of this disclosure. The computer device 1100 may be a classical computer. The computer device may be configured to implement the quantum computing method provided in the foregoing embodiments.

Specifically, the computer device 1100 includes a central processing unit 1101 (such as a central processing unit (CPU), a graphics processing unit (GPU), and a field programmable gate array (FPGA)), a system memory 1104 including a random-access memory 1102 (RAM) and a read-only memory (ROM) 1103, and a system bus 1105 connecting the system memory 1104 and the central processing unit 1101. The computer device 1100 further includes a basic input/output system (I/O system) 1106 configured to transmit information between components in the server, and a mass storage device 1107 configured to store an operating system 1113, an application program 1114, and another program module 1115.

In an embodiment, the basic I/O system 1106 comprises a display 1108 configured to display information and an input device 1109, such as a mouse or a keyboard, configured to input information for a user. The display 1108 and the input device 1109 are both connected to the CPU 1101 by using an input/output controller 1110 connected to the system bus 1105. The basic I/O system 1106 may further include the I/O controller 1110 configured to receive and process inputs from a plurality of other devices such as a keyboard, a mouse, or an electronic stylus. Similarly, the input/output controller 1110 further provides output to a display screen, a printer, or other types of output devices.

In an embodiment, the mass storage device 1107 is connected to the CPU 1101 by using a mass storage controller (not shown) connected to the system bus 1105. The mass storage device 1107 and an associated computer-readable medium provide non-volatile storage for the computer device 1100. That is, the mass storage device 1107 may include a computer-readable medium (not shown) such as a hard disk or a compact disc read-only memory (CD-ROM) drive.

Without loss of generality, the computer-readable medium may comprise a computer storage medium and a communication medium. The computer storage medium comprises volatile and non-volatile, removable and non-removable media that are configured to store information such as computer-readable instructions, data structures, program modules, or other data and that are implemented by using any method or technology. The computer storage medium includes a RAM, a ROM, an erasable programmable read-only memory (EPROM), an electrically erasable programmable read-only memory (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The system memory 1104 and the mass storage device 1107 may be collectively referred to as a memory.

According to the embodiments of this disclosure, the computer device 1100 may further be connected, through a network such as the Internet, to a remote computer on the network. That is, the computer device 1100 may be connected to a network 1112 by using a network interface unit 1111 connected to the system bus 1105, or may be connected to another type of network or a remote computer system (not shown) by using a network interface unit 1111.

The memory (including a non-transitory computer-readable storage medium) further includes at least one instruction, at least one program, a code set, or an instruction set. The at least one instruction, the at least one program, the code set, or the instruction set is stored in the memory and is configured to be executed by one or more processors (including processing circuitry) to implement the foregoing quantum computing method.

A person skilled in the art may understand that the structure shown in FIG. 11 does not constitute any limitation on the computer device 1100, and the computer device may include more components or fewer components than those shown in the figure, or some components may be combined, or a different component deployment may be used.

An embodiment of this disclosure further provides a computer device, and the computer device may be configured to implement the quantum computing method provided in the foregoing embodiments. That is, the quantum computing method provided in this disclosure can be performed by the computer device. The computer device may be a hybrid device environment of a classical computer and a quantum computer, for example, the method is implemented through the cooperation of the classical computer and the quantum computer. In the hybrid device environment of a classical computer and a quantum computer, the classical computer executes computer programs to implement some classical calculations and control the quantum computer, and the quantum computer implements operations such as control and measurement of qubits. For example, the foregoing preparation circuit, PQC and measurement circuit can be set in a quantum computer, and a computer program is executed by a classical computer to control the quantum computer. The quantum computer is controlled to perform operations such as preparing an initial state of the quantum many-body system through the preparation circuit, processing the initial state through the PQC to obtain an output state of the PQC, and measuring the output state of the PQC through the measurement circuit. In addition, the classical computer can also execute a computer program to implement some classical calculations.

In some embodiments, the computer device may also be a separate classical computer, that is, the steps of the quantum computing method provided in this disclosure are performed by a classical computer. For example, numerical experiment simulation is performed on the foregoing method through executing a computer program by a classical computer; or the computer device may be a separate quantum computer, that is, the steps of the quantum computing method provided in this disclosure are performed by the quantum computer, which is not limited in this disclosure.

In an exemplary embodiment, a computer-readable storage medium is further provided. The storage medium stores at least one instruction, at least one program, a code set, or an instruction set, and the at least one instruction, the at least one program, the code set, or the instruction set, when executed by a processor, implements the foregoing quantum computing method.

The computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing quantum computing method.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A quantum computing method, comprising:
   determining an initial quantum state of a quantum system;
   inputting the initial quantum state to a quantum circuit corresponding to the quantum system and obtaining a quantum state outputted by the quantum circuit, wherein the outputted quantum state is a quantum circuit generation state corresponding to the quantum system;
   updating a quantum system parameter based on the outputted quantum circuit generation state, wherein the quantum system parameter comprises a quantum imaginary-time parameter;
   updating a quantum circuit parameter of the quantum circuit according to the updated quantum system parameter to obtain an updated quantum system; and
   determining a final quantum state of the quantum system as a minimum eigenstate of the quantum system.

2. The method according to claim 1, wherein
   the quantum system parameter is determined based on a first-order partial derivative of a Lyapunov function with respect to time.

3. The method according to claim 1, further comprising controlling an evolution process of the quantum system based on a control Hamiltonian providing an evolution trend.

4. The method according to claim 3, wherein the method further comprises:
   determining the control Hamiltonian based on a diagonal matrix formed by an identity matrix and a Pauli-Z matrix.

5. The method according to claim 1, wherein the updating the quantum system parameter comprises:
   updating the quantum system parameter to minimize energy of the quantum system.

6. A quantum computing apparatus, comprising:
   processing circuitry configured to
   determine an initial quantum state of a quantum system;
   input the initial quantum state to a quantum circuit corresponding to the quantum system and obtaining a quantum state outputted by the quantum circuit, wherein the outputted quantum state is a quantum circuit generation state corresponding to the quantum system;
   update a quantum system parameter based on the outputted quantum circuit generation state, wherein the quantum system parameter comprises a quantum imaginary-time parameter;
   update a quantum circuit parameter of the quantum circuit according to the updated quantum system parameter to obtain an updated quantum system; and
   determine a final quantum state of the quantum system as a minimum eigenstate of the quantum system.

7. The apparatus according to claim 6, wherein
   the quantum system parameter is determined based on a first-order partial derivative of a Lyapunov function with respect to time.

8. The apparatus according to claim 6, wherein
   controlling an evolution process of the quantum system based on a control Hamiltonian providing an evolution trend.

9. The apparatus according to claim 8, wherein the processing circuitry is further configured to:
   determine the control Hamiltonian based on a diagonal matrix formed by an identity matrix and a Pauli-Z matrix.

10. The apparatus according to claim 6, wherein the processing circuitry is further configured to update the quantum system parameter to minimize energy of the quantum system.

11. A non-transitory computer-readable storage medium storing computer-readable instructions thereon, which, when executed by a computer device, cause the computer device to perform a quantum computing method comprising:
    determining an initial quantum state of a quantum system;
    inputting the initial quantum state to a quantum circuit corresponding to the quantum system and obtaining a quantum state outputted by the quantum circuit, wherein the outputted quantum state is a quantum circuit generation state corresponding to the quantum system;
    updating a quantum system parameter based on the outputted quantum circuit generation state, wherein the quantum system parameter comprises a quantum imaginary-time parameter;
    updating a quantum circuit parameter of the quantum circuit according to the updated quantum system parameter to obtain an updated quantum system; and
    determining a final quantum state of the quantum system as a minimum eigenstate of the quantum system.

12. The non-transitory computer-readable storage medium according to claim 11, wherein
    the quantum system parameter is determined based on a first-order partial derivative of a Lyapunov function with respect to time.

13. The non-transitory computer-readable storage medium according to claim 11, wherein the method further comprises:
    controlling an evolution process of the quantum system based on a control Hamiltonian providing an evolution trend.

14. The non-transitory computer-readable storage medium according to claim 13, wherein the method further comprises:
    determining the control Hamiltonian based on a diagonal matrix formed by an identity matrix and a Pauli-Z matrix.

15. The non-transitory computer-readable storage medium according to claim 11, wherein the updating the quantum system parameter comprises:

updating the quantum system parameter to minimize energy of the quantum system.

\* \* \* \* \*